United States Patent [19]
Gabas et al.

[11] Patent Number: 6,085,610
[45] Date of Patent: Jul. 11, 2000

[54] ADJUSTING DEVICE FOR THE TERMINALS OF CONTROL CABLES

[75] Inventors: Carlos Gabas, Barcelona; Rafael Navo, Rubi, both of Spain

[73] Assignee: Fico Cables, S.A., Barcelona, Spain

[21] Appl. No.: 09/180,724

[22] PCT Filed: Apr. 17, 1997

[86] PCT No.: PCT/ES97/00094

§ 371 Date: Nov. 13, 1998

§ 102(e) Date: Nov. 13, 1998

[87] PCT Pub. No.: WO97/43553

PCT Pub. Date: Nov. 20, 1997

[30] Foreign Application Priority Data

May 14, 1996 [ES] Spain ..................................... 9601078

[51] Int. Cl.[7] .................................................... F16C 1/22
[52] U.S. Cl. ..................... 74/501.5 R; 74/502.6
[58] Field of Search ........................... 74/501.5 R, 502.4, 74/502.6; 192/111 A

[56] References Cited

FOREIGN PATENT DOCUMENTS

| 641945 | 3/1995 | European Pat. Off. . | |
| 2176861 | 1/1987 | United Kingdom | 192/111 A |
| WO 97/35118 | 9/1997 | WIPO . | |

*Primary Examiner*—Mary Ann Battista
*Attorney, Agent, or Firm*—Michael J. Striker

[57] ABSTRACT

This adjusting device is applicable to terminals (2) which include a main body (11) provided with a linkage (19), and has on the main body (11), a housing (12) in which are set a regulating rod (22) provided with a threaded retaining portion (42), a thrust spring (23), two retaining bodies (20) provided with respective threaded retaining portions (26) which coincide with that of the rod (22), two retaining springs (21) and two fixing extensions (48, 61) of a fixing body (24). The fixing body (24) can take up two positions, one exterior position in which the retaining bodies (20) and the rod (22) are out of mesh, and an interior or control cable (3) length-adjustment position in which the bodies (20) and rod (22) are in mesh.

6 Claims, 2 Drawing Sheets

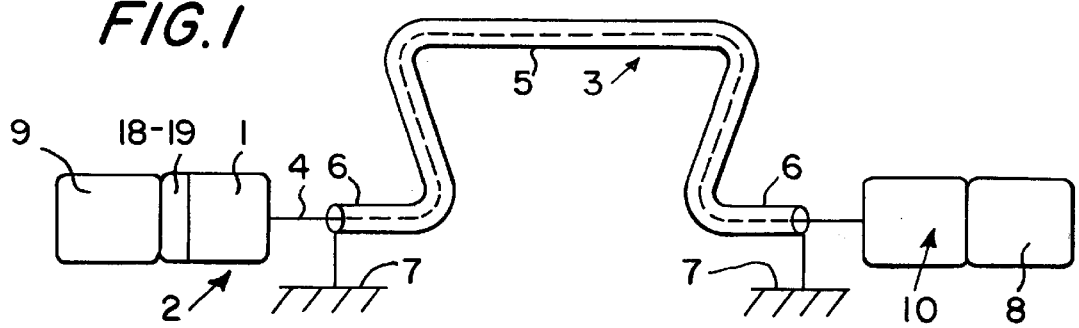
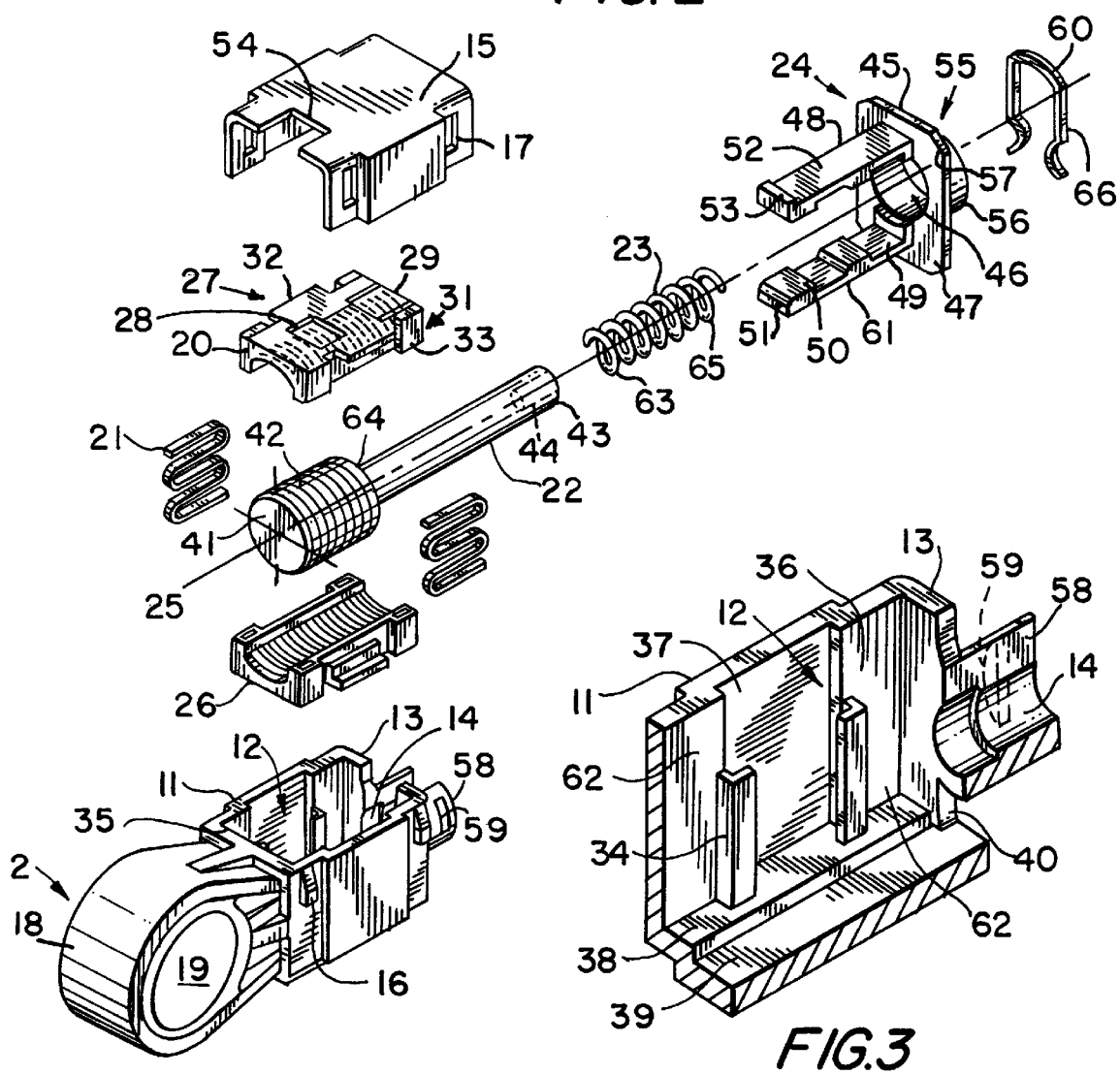

ADJUSTING DEVICE FOR THE TERMINALS OF CONTROL CABLES

TECHNICAL FIELD OF THE INVENTION

The object of the present invention is an adjusting device for control cable terminals, of general application to control cables which, essentially made up of a sheathed steel cable, are widely used in the automobile industry. More particularly, the adjusting device of the invention is applicable to control cables used as a means of linkage between the gear-shift mechanism and its actuating lever.

BACKGROUND OF THE INVENTION

As is known in the art, the control cables made up of a sheathed steel cable used in the automobile industry for the transmission of thrust-traction forces, and usually known as push-pull operating cables, are frequently mounted on the vehicle in such a way that the ends of the steel cable sheath are attached to fixed points along the route of the control cable, while the ends of the steel cable have a corresponding terminal designed for detachable coupling thereof to a control device and its associated mechanism, respectively, such as the above-mentioned gear-shift lever and the corresponding gear-shift mechanism. Known, too, is the fact that such control cables generally include an adjusting device whose purpose, during fitting of the cable onto the vehicle, consists in adjusting the length of the sheathed portion of steel cable in order to achieve suitable functioning of the control cable by taking up the length tolerances of each particular vehicle. It is the usual practice to fit said adjusting device on one of the terminals of the control cable.

Essentially, the known embodiments of adjusting devices include a regulating rod linked by one of its ends to the corresponding end of the steel cable, while the other end is inserted into a housing of the terminal through which it can slide, and means which secure the position of the rod with respect to the terminal. During fitting of the cable onto the vehicle, the user generally adjusts the portion of rod housed inside the terminal, thereby adjusting the sheathed portion of steel cable, and then proceeds to secure the position of the regulating rod by actuating the fixing means.

The patent document PCT/ES97/00057 (WO 97/35118) discloses a self-adjusting device for control cable terminals comprising a main body, a regulating rod partially housed in the main body, a thrust spring working permanently under compression in such a way that the regulating rod is permanently subjected to a force acting from the outside inwards, and means for securing the position of the regulating rod.

The known embodiments of adjusting devices such as those described above share, wholly or partially, the following disadvantages. Adjustment of the sheathed portion of steel cable is implemented manually, thereby leading to an inconsistency of results which can affect the correct functioning of the control cable, while the fixing of the position reached by the regulating rod once the length of said sheathed portion has been adjusted calls for the use of a tool and therefore increases the costs of fitting the control cable onto the vehicle.

SUMMARY

An adjusting device of original structure and functioning for control cable terminals is made known hereby in order to provide a solution to the above-described problems presented by the known embodiments of adjusting devices.

The adjusting device of the invention is for control cable terminals made up essentially of a sheathed steel cable, which terminals have a main body provided with means of linkage to a control actuating device or to its associated mechanism, the adjusting device including:

on the main body, a longitudinal housing open at one of its ends, the rear end;

a regulating rod arranged in the longitudinal housing of the main body and through which the rod can slide in both directions, which rod projects permanently from the main body by one of its ends, the exterior end, attached to the corresponding end of the steel cable of the control cable, while the other end, the interior end, has a threaded retaining portion;

a thrust spring coaxially arranged with respect to the regulating rod, which spring works permanently under compression with one of its ends resting against the interior end of the regulating rod and its other end against the main body, in such a way that the regulating rod is permanently subjected to a force directed from the outside inwards; and fixing means which fix the position of the regulating rod with respect to the main body.

The adjusting device of the invention is characterized in that the fixing means include:

two retaining bodies arranged in the longitudinal housing of the main body, facing each other and oriented transversally with respect to the regulating rod which runs between them, which retaining bodies have respective threaded retaining portions which coincide with the threaded portion of the regulating rod and can slide transversally between two positions, one position in which the threaded retaining portions of the retaining bodies and of the regulating rod mesh with each other and secure the position of the rod with respect to the main body, and an out-of-mesh position of said threaded portions in which the regulating rod can slide in both directions;

two retaining springs arranged between the two retaining bodies, one on either side of the regulating rod, which work permanently under compression with each of their two ends resting against a respective retaining body, in such a way that they tend permanently to situate the retaining bodies in the out-of-mesh position;

a fixing body fitted onto the open end of the longitudinal housing of the main body and provided with a through-orifice through which the regulating rod can slide in both directions, which fixing body includes two fixing extensions arranged between the retaining and main bodies and able to slide in both directions between two extreme positions, exterior and interior, respectively;

on the retaining bodies and on the fixing extensions of the fixing body, respective and complementary meshing means which, when the fixing body is in the exterior position, permit the action of the retaining springs to move the retaining bodies into the out-of-mesh position, whereas when the fixing body is in the interior position the retaining bodies take up the meshed position by submitting the retaining springs to greater compression due to reduction of their length.

According to another characteristic of the adjusting device of the invention, the meshing means include, in each retaining body, two fixing housings arranged in centred and longitudinal position, and on each of the fixing extensions of the fixing body, two fixing projections which coincide with the fixing housings of the corresponding retaining body, in which they can be housed with a snug fit, with each of the fixing housings and projections having a corresponding sliding plane which forms a certain angle oriented in the direction of outside-inward movement of the fixing body.

According to another characteristic of the retaining device of the invention, the main and fixing bodies have respective and complementary means of positioning which fix the end positions, exterior and interior, which the fixing body can take up.

According to another characteristic of the adjusting device of the invention, the means of positioning include, on the main body, a longitudinal positioning slot superimposed upon one of the fixing extensions of the fixing body and, on said fixing extension, a transverse positioning projection so designed that it can slide in both directions along the positioning slot.

According to another characteristic of the adjusting device of the invention, the main and fixing bodies have respective and complementary securing means which, once the position of the regulating rod has been fixed by the action of the retaining and fixing bodies, prevents sliding of the fixing body with respect to the main body.

According to another characteristic of the adjusting device of the invention, the securing means include:

on the open end of the main body, a securing extension which is coaxial with respect to the regulating rod and is provided with two transverse securing slots facing each other;

on the fixing body a securing extension provided with two transverse securing through-slots facing each other and coinciding with the slots of the securing extension of the main body, both securing extensions being coaxial to each other and capable of mutual sliding; and a substantially U-shaped securing spring which works permanently under compression, which spring, when the fixing body is in the exterior position, has both of its arms in respective securing slots of the fixing body and, when the fixing body is in the interior position, has its two arms in a respective facing pair of securing slots of the main and fixing bodies, thereby preventing sliding of the fixing body.

BRIEF DESCRIPTION OF THE DRAWINGS

The drawing sheets of the present specification show the adjusting device of the invention for control cable terminals. In said drawings:

FIG. 1 is a schematic diagram of a control cable fitted with the device of the invention;

FIG. 2 is a perspective view of the components making up the device of the invention prior to assembling thereof;

FIG. 3 is a perspective, enlarged-section view of the longitudinal housing of the main body of the device of the invention;

DETAILED DESCRIPTION OF THE EXAMPLE OF EMBODIMENT

Figure 4:
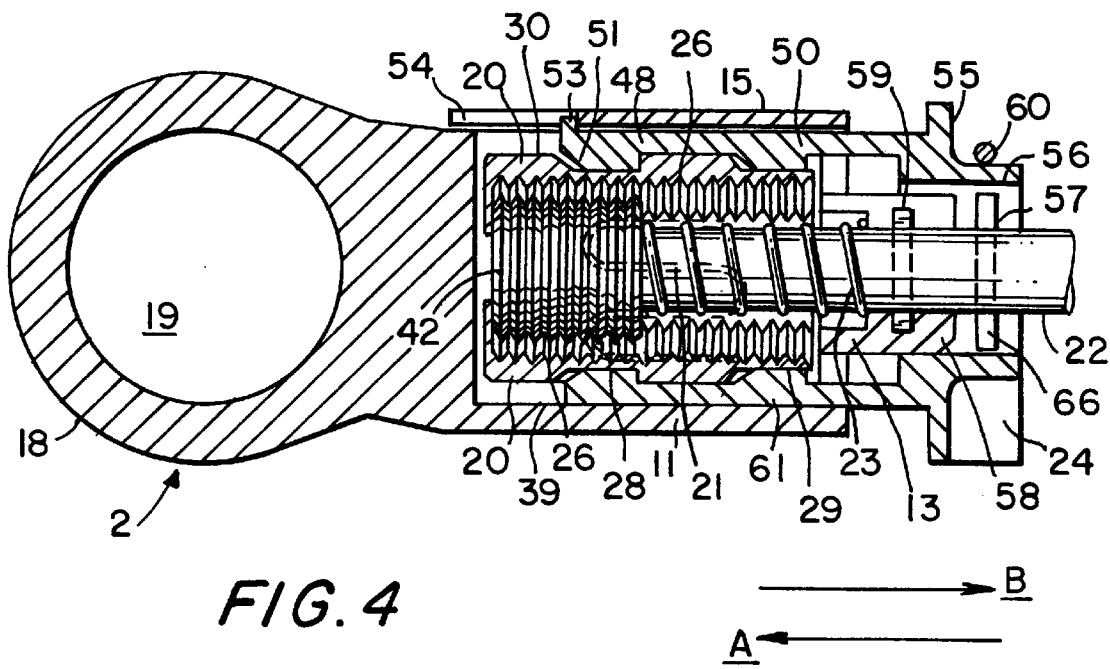
FIG. 4 is a longitudinal section view of the device of the invention as supplied ex-works.

FIG. 1 shows schematically the application of the adjusting device 1 of the invention to a terminal 2 of a control cable 3 made up essentially of a steel cable 4 provided with a sheath 5 both ends 6 of which are attached to respective fixed points 7. In this example of application of the adjusting device of the invention, the control cable 3 is the means of linkage between a control actuating device 8 and its associated mechanism 9, both shown schematically. As stated above, this control actuating device 8 and its associated mechanism 9 can consist, for example, in the gear-shift lever and gearbox, respectively, of an automobile vehicle. The terminal 2, with which the adjusting device of the invention is fitted, is in this example of application attached to the associated mechanism 9; it should be understood, however, that the adjusting device of the invention can be mounted on the other terminal 10 attached to the control actuating device 8 without this in any way affecting its operation.

FIGS. 2 and 3 show how the terminal 2 includes a hollow main body 11 of substantially elongated parallele-piped shape which forms a longitudinal housing 12 whose rear wall 13 has a through-orifice 14 which makes up its rear open end, the longitudinal housing 12 having a closure cover 15 which can be coupled by means of prismatic projections 16 and through-slots 17 which they have respectively and complementarily. Longitudinally, on the main body 11 there can be distinguished an axial extension 18 which has a through-orifice 19 which form means of linkage with the associated mechanism 9. It can be understood that the main body 11, the axial extension 18 and the means of linkage can adopt any other configuration different from that shown and adapted to each specific case of application without this affecting the essential nature of the invention.

As shown separately in FIG. 1, the adjusting device 1 includes two equal retaining bodies 20, two equal retaining springs 21, a regulating rod 22, a thrust spring 23, a fixing body 24 and a fixing spring 60.

FIG. 3 shows how the longitudinal housing 12 of the main body includes: on each one of two of its lateral sides 36 facing each other in centred position, two substantially L-shaped parallel guides 34 which make op a transverse housing 37 designed to receive a respective thrust spring 21; on the lateral side which forms a dihedral angle with the lateral sides 36 or back 38, a centred fixing slot 39; on the back wall 13, two fixing openings 40 and, to the exterior, a securing extension 58 on which are two securing slots 59 running transversally.

Figure 5:
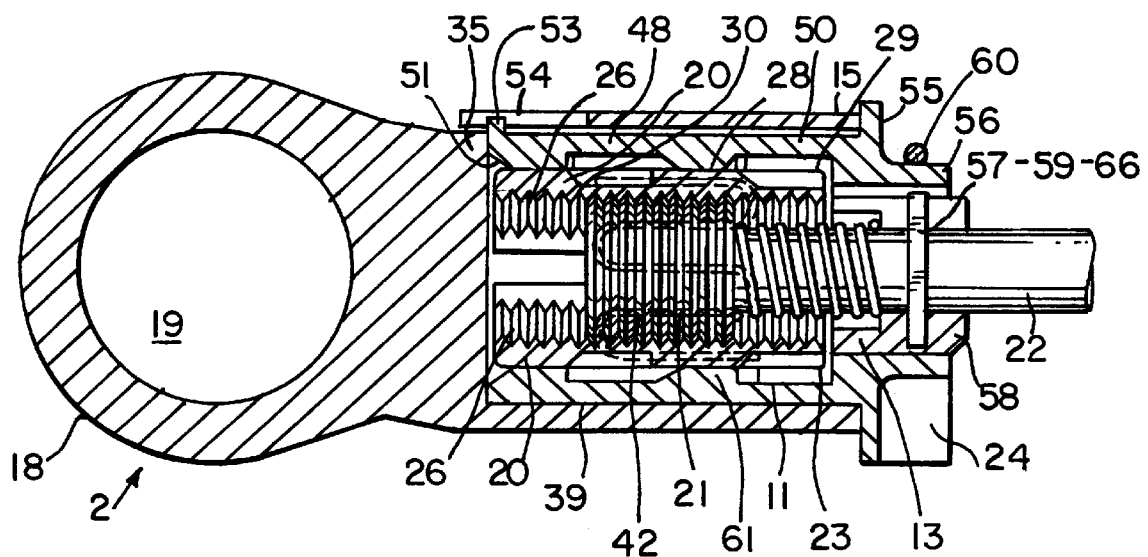
FIG. 5 is a longitudinal section view of the device of the invention once the length of the control cable has been adjusted.

FIG. 2 shows how the retaining bodies 20 are of substantially rectangular parallelepiped shape, having one of the larger sides, the interior side 25, with a transversally oriented threaded retaining portion 26 which runs the entire length of the body 20, while the other larger side, the exterior side 27, has two fixing housings running longitudinally and centred, one 28 in central position and the other 29 in end position, provided with a respective plane of sliding 30 shown in section in FIGS. 4 and 5. Each retaining body 20 has in centred position on each one of its longitudinal lateral sides 31 a transverse support extension 32 and a respective guide-projection 33 on both of its ends, all this so designed that the transverse support extensions 32 can be arranged between the two guides 34, while the guide-projections 33 can be arranged in the passages 62 formed between said guides 34 and the rear 13 and front 35 walls, respectively, of the longitudinal housing 12.

The regulating rod 22 is of substantially elongated cylindrical shape, having its interior end 41 provided with a threaded retaining portion 42 coinciding with the threaded retaining portions 26 of the retaining bodies 20, and its exterior end 43 is provided with an axial orifice 44 designed for reception and fixing (not shown) of the corresponding end of the steel cable 4.

FIG. 2 shows how the fixing body 24 includes a support plate 45 of quadrangular outline to coincide with the rear wall 13 of the longitudinal housing 12, which support plate 45 has: in centred position, a through-orifice 46; on its front side 47 two fixing extensions 48, 61 parallel to each other which, on their facing interior sides 49 have, respectively, two fixing projections 50 provided with sliding planes 51 coinciding with the fixing housings 28, 29 and sliding planes 30 of the retaining bodies 20, FIGS. 2, 4 and 5 show how one of the fixing extensions, the one marked with reference number 48, has on its exterior side 52 a transverse positioning projection 53 which coincides in dimensions with a longitudinal positioning slot 54 provided on the closure cover 15; and FIGS. 2, 4 and 5 show how on the rear side 55 there is a cylindrical securing extension 56 provided with two securing through-slots 57 running transversally, which cylindrical securing extension 56 is designed to receive with a snug fit the cylindrical securing extension 58 of the rear wall 13 of the main body 11.

FIGS. 4 and 5 show the assembly of the parts described above once the closure cover 15 has been attached to main body 11, the arrangement of said parts being as follows: the fixing body 24 has its two fixing extensions 48, 61 provided in the longitudinal housing 12, one of them, the one marked with reference number 61, being provided in the fixing slot 39 of the bottom 38 of the housing 12, while the other, the one marked with reference number 48, is superimposed on the closure cover 15 with its positioning projection 53 provided in the positioning slot 54; the retaining bodies 20 have their transverse support extensions 32 and guide-projections 33 located in the transverse housings 37 and passages 62 of the longitudinal housing 12, respectively, and in such a way that their respective threaded retaining portions 26 are facing each other; the retaining springs 21 are in the transverse housings 37, working permanently under compression with their respective ends resting against corresponding transverse support extensions 32 of the retaining bodies 20; the interior end 41 with its threaded retaining portion 42 of the regulating rod 22 is arranged between the two retaining bodies 20; the thrust spring 23 is arranged coaxially with respect to the regulating rod 22, working permanently under compression with one of its ends, the front end 63, resting against a step 64 on the regulating rod 22, and its other end, the rear end 65, against the rear wall 13 of the main body 11; and the fixing spring 60 has its arms 66 in the securing through-slots 57 of the fixing body 24.

FIG. 4 shows how the adjusting device of the invention is supplied ex-works, in which condition the arrangement of the parts is as follows. The fixing body 24 occupies the exterior position bounded by the positioning projection 53 and the positioning slot 54 of the closure cover 15; the retaining bodies 20 subjected to the action of the retaining springs 21 occupy the out-of-mesh position in which the fixing projections 50 of the fixing extensions 48, 61 of the fixing body 24 are housed in the corresponding fixing housings 28, 29 of the retaining bodies 20; and the regulating rod 22, in the absence of external action, takes up its most interior position in the longitudinal housing 12 driven by the thrust spring 23, with the regulating rod 22 able to slide in both directions marked A and B in FIG. 4.

With the terminal 10 fixed to the control actuating mechanism 8 and the two ends 6 of the steel cable 4 sheath 5 fixed to respective fixed points 7, as shown schematically in FIG. 1, the operation of the adjusting device of the invention is as described below. Firstly, the user attaches the terminal 2 to the associated mechanism 9, simply by applying a force on the main body 11 in the direction indicated as A in FIG. 4 and housing the corresponding part (not shown) of the associated mechanism 9 in the orifice 19 of the axial extension 18. In this situation, the thrust spring 23 is subjected to greater compression due to reduction of its length, as shown in FIG. 5, and the length of the control cable 3 is adjusted by reduction of the portion of the regulating rod 22 contained in the longitudinal housing 12 of the main body 11. The user then applies a force in the direction indicated as A on the fixing body 24, which causes it to move in the same direction, this movement taking place in such a way that the sliding planes 51 of the fixing projections 50 of the fixing extensions 48, 61 of the fixing body 24 slide over the corresponding sliding planes 30 of the fixing housings 28, 29 of the retaining bodies 20, this sliding motion of the fixing body 24 causing an approach sliding movement of the retaining bodies 20 which, as shown in FIG. 5, then take up the meshed position, in which the retaining springs 21 are subjected to greater compression due to reduction of their length and the threaded retaining portion 42 of the regulating rod 22 is meshed with the threaded retaining portions 26 of the retaining body 20, the sliding of the fixing body 24 continuing until the transverse positioning projection 53 reaches the interior position shown in FIG. 4 in which the front wall 35 of the main body 11 acts as a stop, thus leaving the position of the regulating rod 22 with respect to the main body 11 fixed. Simultaneously with the sliding of the fixing body 24, and when the latter reaches said interior meshed position shown in FIG. 5, the arms 66 of the fixing spring 60 are subjected to a double elastic deformation, a first deformation in which the arms 66 are separated in order to permit the extension 58 of the main body 11 to pass through them, and a second deformation in the opposite direction to the previous one in which the arms 66 move by elastic reaction in the securing slots 59 of said extension 58, thereby fixing the position of the fixing body 24 with respect to the main body 11 and ensuring thereby that no untimely meshing of the regulating rod 22 take place.

In those cases in which for any reason the terminal 2 has to be detached from the associated mechanism 9, the user simply has to apply a force on the fixing body 24 in the direction indicated as B in FIG. 4, sliding it in that direction. This sliding motion of the fixing body 24 leads in turn to the arms 66 of the securing spring 60 coming out of the securing slots 59 of the securing extension 58, while at the same time the fixing projections 50 slide on the retaining bodies 20, that sliding motion continuing until said projections 50 are superimposed upon the fixing housings 28, 29 of the retaining bodies 20, at which moment the elastic reaction of the retaining springs 21 causes the retaining bodies 20 to become detached and take up the out-of-mesh position shown in FIG. 4, in which the regulating rod 22 can slide in both directions A, B with respect to the main body 11, leaving the adjusting device of the invention in the initial position described above.

We claim:

1. An adjusting device for control cable (3) terminals (2), composed of a sheathed steel cable (4, 5), which terminals (2) have a main body (11) provided with means of linkage (19) to a control actuating device (8) or to its associated mechanism (9), the adjusting device including:
   on the main body (11), a longitudinal housing (12) open at one of its ends, the rear end (13, 14);
   a regulating rod (22) arranged in the longitudinal housing (12) of the main body (11), through which the rod can slide in both directions (A, B), which rod (22) projects permanently from the main body (11) by one of its ends, the exterior end (43), attached to the corresponding end of the steel cable (4) of the control cable (3), while the other end, the interior end (41), has a threaded retaining portion (42);

a thrust spring (23) coaxially arranged with respect to the regulating rod (22), which spring works permanently under compression with one of its ends (63) resting against the interior end (41) of the regulating rod (22) and its other end (65) against the main body (11), in such a way that the regulating rod (22) is permanently subjected to a force directed from the outside inwards; and fixing means which fix the position of the regulating rod (22) with respect to the main body (11), characterized in that the fixing means include:

two retaining bodies (20) arranged in the longitudinal housing (12) of the main body (11), facing each other and oriented transversally with respect to the regulating rod (22) which runs between them, which retaining bodies (20) have respective threaded retaining portions (26) which coincide with the threaded portion of the regulating rod (22) and can slide transversally between two positions, one position in which the threaded retaining portions (26, 42) of the retaining bodies (20) and of the regulating rod (22) mesh with each other and secure the position of the rod (22) with respect to the main body (11), and an out-of-mesh position of said threaded portions (26, 42) in which the regulating rod (22) can slide in both directions;

two retaining springs (21) arranged between the two retaining bodies (20), one on either side of the regulating rod (22), which work permanently under compression with each of their two ends resting against a respective retaining body (20), in such a way that they tend permanently to situate the retaining bodies (20) in the out-of-mesh position;

a fixing body (24) fitted onto the open end (13, 14) of the longitudinal housing (12) of the main body (11) and provided with a through-orifice (46) through which the regulating rod (22) can slide in both directions, which fixing body (24) includes two fixing extensions (48, 61) arranged between the retaining (20) and main (11) bodies and able to slide in both directions between two extreme positions, exterior and interior, respectively;

on the retaining bodies (20) and on the fixing extensions (48, 61) of the fixing body (24), respective and complementary meshing means which, when the fixing body (24) is in the exterior position, permit the action of the retaining springs (21) to move the retaining bodies (20) into the out-of-mesh position, whereas when the fixing body (24) is in the interior position the retaining bodies (20) take up the meshed position by submitting the retaining springs (21) to greater compression due to reduction of their length.

2. An adjusting device as claimed in claim 1, characterized in that the meshing means include, in each retaining body (20), two fixing housings (28, 29) arranged in a centered and longitudinal position, and on each of the fixing extensions (48, 61) of the fixing body (24), two fixing projections (50) which coincide with the fixing housings (28, 29) of the corresponding retaining body (20), in which they can be housed with a snug fit, with each of the fixing housings (28, 29) and projections (50) having a corresponding sliding plane (30, 51) which forms a certain angle oriented in the direction of outside-inward movement of the fixing body (24).

3. An adjusting device as claimed in claim 1, characterized in that the main (11) and fixing (24) bodies have respective and complementary means of positioning which fix the end positions, exterior and interior, which the fixing body (24) can take up.

4. An adjusting device as claimed in claim 3, characterized in that the means of positioning include, on the main body (11), a longitudinal positioning slot (54) superimposed upon one of the fixing extensions (48) of the fixing body (24) and, on said fixing extension (48), a transverse positioning projection (53) so designed that it can slide in both directions along the positioning slot (54).

5. An adjusting device as claimed in claim 1, characterized in that the main (11) and fixing (24) bodies have respective and complementary securing means which, once the position of the regulating rod (22) has been fixed by the action of the retaining (20) and fixing (24) bodies, prevents sliding of the fixing body (24) with respect to the main body (11).

6. An adjusting device as claimed in claim 5, characterized in that the securing means include:

on the open end (13, 14) of the main body (11), a securing extension (58) which is coaxial with respect to the regulating rod (22) and is provided with two transverse securing slots (59) facing each other;

on the fixing body (24) a securing extension (56) provided with two transverse securing through-slots (57) facing each other and coinciding with the slots of the securing extension (58) of the main body (11), both securing extensions (58, 56) being coaxial to each other and capable of mutual sliding; and a substantially U-shaped securing spring (60) which works permanently under compression, which spring (60), when the fixing body (24) is in the exterior position, has both of its arms (66) in respective securing slots (57) of the fixing body (24) and, when the fixing body (24) is in the interior position, has its two arms (66) in a respective facing pair of securing slots (57, 59) of the main (11) and fixing (24) bodies, thereby preventing sliding of the fixing body (24).

* * * * *